Aug. 23, 1966 A. A. JACOBELLIS ETAL 3,268,235
PISTON ACCUMULATOR SEAL
Filed March 29, 1965 2 Sheets-Sheet 1
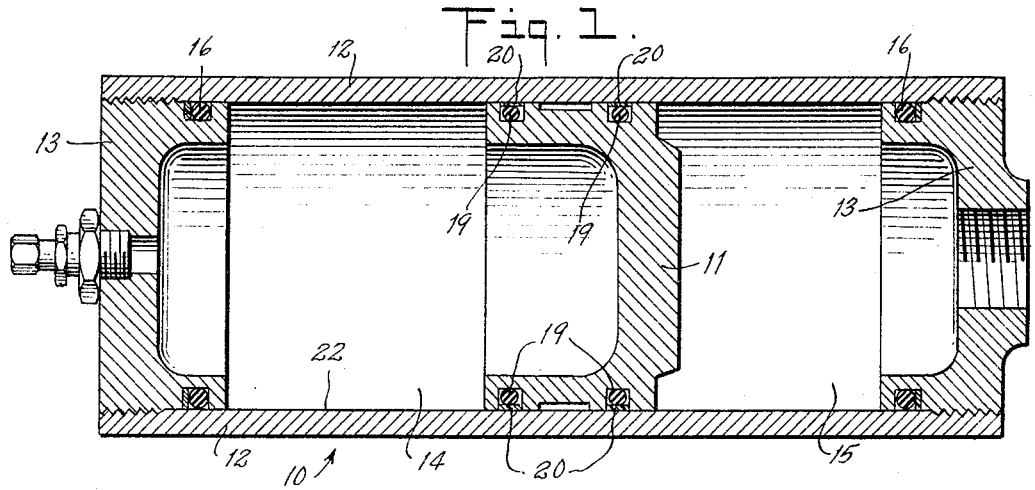
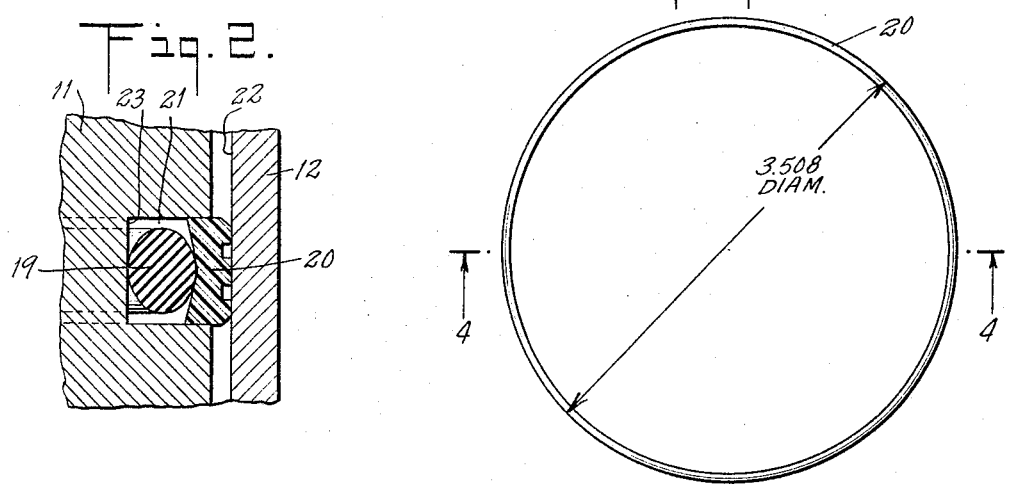
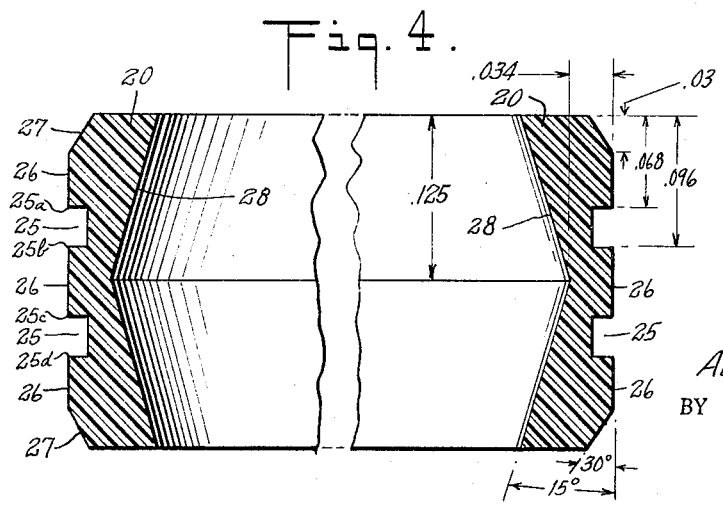
INVENTOR.
ALPHONSE A. JACOBELLIS
BY
Kenyon & Kenyon
ATTORNEYS

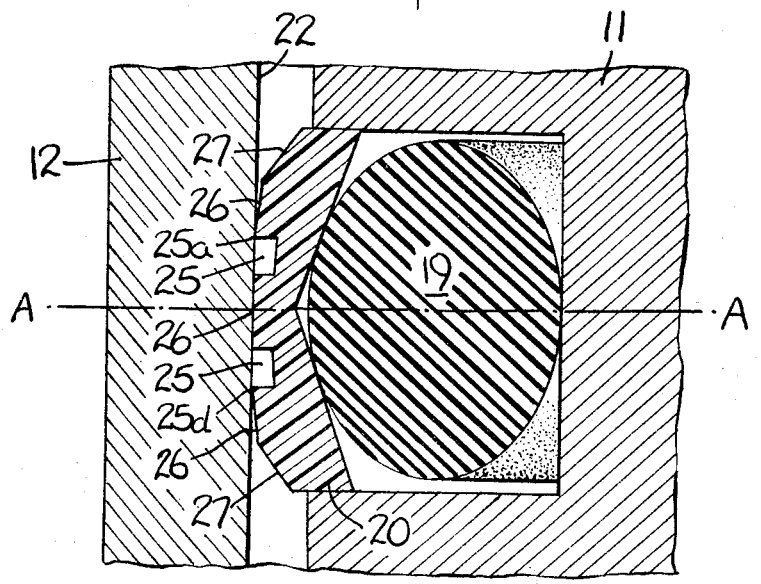

United States Patent Office 3,268,235
Patented August 23, 1966

3,268,235
PISTON ACCUMULATOR SEAL
Alphonse A. Jacobellis, 7 New Dorp Place,
Huntington Station, N.Y.
Filed Mar. 29, 1965, Ser. No. 444,945
2 Claims. (Cl. 277—165)

This is a continuation-in-part of Serial No. 223,640, now abandoned, filed on September 14, 1962.

This invention relates to piston type pressure accumulators and more particularly to the piston seal between the gas and liquid chambers of the accumulator.

The ideal piston seal in an accumulator has conflicting characteristics in that it must serve to effectively seal the gas chamber from the liquid chamber while at the same time provide minimum friction as the piston moves in order to keep piston inertia at a minimum.

The seal serves to keep liquid out of the gas chamber and gas out of the liquid chamber. Liquid that leaks into the gas chamber requires servicing of the accumulator to clean out the liquid and it is obviously desirable to keep such maintenance to a minimum. Gas (usually air) that leaks into the liquid chamber enters the system to which the accumulator is attached and is thus detrimental to the functioning of the unit by the introduction of undesirable gas into a hydraulic system.

In order to keep the wear on the seals to a minimum and to keep the drag of the piston to a minimum it is desirable that the piston seals have minimum friction when riding on the inner walls of the accumulator cylinder.

The typical accumulator piston seal has been two spaced apart O-rings. Recently, it has been known to place a thin Teflon ring between each O-ring and the cylinder walls. The Teflon ring provides for low friction riding quality and the O-ring operates to maintain a seal between the gas and liquid chambers.

However, it remains a goal of accumulator piston seal design to improve on the sealing and friction qualities of the prior art. Accordingly, it is the major object of this invention to provide an improved accumulator piston seal.

It is a more particular object of this invention to provide a newly designed Teflon riding seal which will exhibit less friction, have a longer life, and contribute to a lower leakage than prior art seals.

In brief, this invention involves the use of an annular Teflon seal having a configuration that can only be appreciated by recourse to the drawings. Important to the Teflon seal configuration is the existence of cut-away portions at the surface of the seal which rides on the accumulator cylinder. These cut-away portions reduce the friction between the seal and the cylinder and also provide an improved wiping of the liquid that adheres to the cylinder walls. The corners of the Teflon seal are chamfered to prevent the Teflon from extruding between the piston and the cylinder walls. Grooves that are cut out on the riding surface of the seal result in an improved seal in that they provide a multiple corner contact between the Teflon seal and the inner walls of the accumulator cylinder.

This particular Teflon seal thus serves as a better seal with reduced friction, thus serving to improve both of the conflicting characteristics of an ideal seal.

For a better understanding of the invention as well as of other objects and features thereof, reference should be made to the following detailed description to be read in conjunction with the accompanying drawings, wherein like components or portions in the various views are identified by like reference numerals.

In the drawings:

FIG. 1 is a longitudinal sectional view of a piston accumulator.

FIG. 2 is a fragmentary view of FIG. 1 enlarged to show the relationship between the O-ring seal and Teflon seal when assembled on the piston.

FIG. 2A is a view similar to FIG. 2 with the bowing of the Teflon seal exaggerated to demonstrate corner contact between seal and cylinder riding surface.

FIG. 3 is a plan view of the Teflon seal.

FIG. 4 is a cross-section view along the lines 4—4 of the Teflon seal of FIG. 3.

Referring now to the drawings, FIG. 1 illustrates a piston accumulator 10 in which the piston 11 is shown in the main cylinder 12 at an arbitrary position between the end caps 13. The gas chamber 14 is shown on one side of the piston and the liquid chamber 15 is shown on the other side of the piston. Standard O-ring seals 16 are shown in each end cap 13. Since the end caps 13 are stationary, there is no particular problem associated with these seals 16.

The seals of concern in this invention are the seals on the piston 11.

Each seal is composed of an O-ring 19 in contact with a Teflon ring 20 as may best be seen in FIG. 2. The O-ring 19 is entirely located within a recess or groove 21 in the piston 11. The Teflon seal 20 is partially in the piston recess 21 and extends out of the recess 21 to contact the inner surface 22 of the main cylinder 12. The dimensions of the piston recess 21, O-ring 19, and Teflon seal 20 are selected so that when assembled the O-ring 19 will be squeezed between the Teflon seal 20 and the inner wall 23 of the recess 21. Thus the O-ring 19 in compression operates as an effective seal between the recess 21 and the Teflon seal 20.

It is the specific nature of this Teflon seal 20, illustrated in FIGS. 3 and 4, to which this invention is addressed.

The Teflon seal 20 illustrated in FIGS. 3 and 4 is shown with the shape it exhibits prior to assembly and use. It should be remembered in the following description that the Teflon seal 20 illustrated will become somewhat distorted in shape when assembled and used and that the explanation for the exact functioning of the seal 20 will in part assume some distortion. The way in which this distortion enters into the operation of the seal will be made clear in the description.

Two grooves 25 are cut into the flat riding surface 26 of the seal 20. The corners of the riding surfaces 26 of the seal 20 are chamfered 27. The inner surface 28 that is in contact with the O-ring 19 has a shallow V-shaped configuration.

In the preferred embodiment illustrated, typical dimensions are shown. It should be realized that the dimensions may vary considerably and will in large part depend upon the particular application. However, optimum thickness in most applications is 30 to 34 thousandths of an inch.

Teflon, which is universally used for this type of application, has a tendency under pressure to extrude. The chamfer 27 on the corners of the seal 20 eliminates the corners which are most likely to extrude into the space between the piston 11 and cylinder 12. The V-shaped inner surface 28 helps to prevent the seal 20 from climbing out of the piston 11 groove 21. In addition, the chamfers 27 and V-shaped inner surface 28 make it easier to assemble the seal 20 and O-ring 19 as the piston 11 is initially inserted into the cylinder 12. The chamfer 27, by cutting down on the riding surface 26 of the seal 20, decreases the drag on the piston 11 and thus is a factor in improving the response time of the accumulator 10. The decrease in drag afforded by the chamfer 27 design also arises from the elimination of an extruded segment of the seal 20 since such extruded segments materially increase the riding friction.

The grooves 25 also serve to decrease the riding friction by decreasing the riding surface 26 between the seal 20 and the cylinder 12. However, more importantly, the grooves 25 carry lubrication for the seal 20 and thus serve to decrease friction. The lubrication carried is a small amount of liquid in the liquid chamber 15 of the accumulator 10. After a few initial strokes some of the liquid in the chamber 15 is bound to leak into the grooves 25 and will be held there by the grooves 25 to provide the desired lubrication.

As illustrated in FIG. 2A, under the pressure of the O-ring 19, the Teflon seal 20 will bow somewhat. This bowing of the seal 20 will provide what can in over-simplified terms be called four corner contact between the seal 20 and the cylinder wall 22. The four corners are designated as 25a, 25b, 25c and 25d. The corner contacts at corners 25a and 25d will provide considerable localized pressure which will cause those corners 25a, 25d to work into a fairly tight sealing arrangement with the cylinder wall 22. Thus if the seal 20, in FIG. 4, is considered as moving up, the corner 25a will wipe the surface 22 of the cylinder 12 very clean of liquid leaving only the barest film. In this fashion there will be very little leakage of oil into the gas chamber 14. However, there will be sufficient oil left and supplied by the grooves 25 so that the major riding area (between the corners 25b and 25c) will develop very little friction with the cylinder wall 22.

Although FIG. 2A is a somewhat exaggerated representation of what happens, it may be seen that the bowing of the Teflon seal 20 about the O-ring 19 under pressure results in the portions of the riding surface 26 that are closest to the two chamfered corners 27 breaking away slightly from the inner surface 22 of the cylinder 12.

As a consequence of bowing, the riding surface 26 is cut down to one-third or less and the unit area pressure is greatly increased on the portions of the riding surface 26 that are in contact with the inner wall 22. Thus the pressure between the corners 25a, 25d and the cylinder wall 22 is extremely great. Thus, these corners 25a, 25d are rapidly worked into a very tight sealing arrangement with the cylinder wall 22. This corner contact with consequent tight sealing arrangement could not be obtained without the two annular grooves 25. Thus both grooves are essential in order to obtain the benefits of this invention. It is also essential that both of these grooves 25 be on either side of the plane of symmetry A—A of the Teflon ring 20, which plane of symmetry passes through the center of the O-ring 19.

It should be remembered that when it comes to an exact explanation of why the corners 25a, 25b, 25c, 25d are effective, it is difficult if not impossible to give a complete and comprehensive explanation. However, it is clear that the grooves 25 do provide a material improvement in the sealing and riding quality of these Teflon seals 20.

What is claimed is:
1. A sealing assembly comprising:
a cylinder having an inner surface therein,
a piston having a side wall disposed within said cylinder to reciprocate longitudinally therein, side piston having an annular recess in said side wall facing said inner surface of said cylinder,
an O-ring disposed in said recess and
a Teflon sealing ring partially disposed in said recess between said O-ring and said inner surface of said cylinder, said sealing ring having a shallow V-shaped inner surface in pressure contact with said O-ring and an outer riding surface in sealing contact with said inner wall of said cylinder, said riding surface having a pair of annular grooves disposed therein, said grooves being spaced on either side of the plane of symmetry of said sealing ring, said O-ring being squeezed between said V-shaped surface of said sealing ring and the inner wall of said recess in said piston causing said sealing ring to bow solely around said O-ring whereby the outer corner of each of said grooves in said riding surface is forced into intimate contact with said inner surface of said cylinder.

2. A sealing assembly comprising:
a cylinder having an inner surface therein,
a piston having a side wall disposed within said cylinder to reciprocate longitudinally therein, side piston having an annular recess in said side wall facing said inner surface of said cylinder,
an O-ring disposed in said recess and
a Teflon sealing ring partially disposed in said recess between said O-ring and said inner surface of said cylinder, said sealing ring being of a width substantially equal to the width of said recess to be held therein against lateral movement and having a shallow V-shaped inner surface in pressure contact with said O-ring and an outer riding surface in sealing contact with said inner wall of said cylinder, said riding surface having a chamfer on each end thereof and a pair of annular grooves disposed therein, said grooves being spaced on either side of the plane of symmetry of said sealing ring, said O-ring being squeezed between said V-shaped surface of said sealing ring and the inner wall of said recess in said piston causing said sealing ring to bow solely around said O-ring whereby the outer corner of each of said grooves in said riding surface is forced into intimate contact with said inner surface of said cylinder.

References Cited by the Examiner

UNITED STATES PATENTS 3,033,578   5/1962   Kellogg _____ 277—214 X

FOREIGN PATENTS 1,214,899   11/1959   France.

LAVERNE D. GEIGER, *Primary Examiner.*

J. MEDNICK, *Assistant Examiner.*